(12) United States Patent
Morrison

(10) Patent No.: US 8,118,546 B2
(45) Date of Patent: Feb. 21, 2012

(54) GRID CERAMIC MATRIX COMPOSITE STRUCTURE FOR GAS TURBINE SHROUD RING SEGMENT

(75) Inventor: Jay A. Morrison, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 759 days.

(21) Appl. No.: 12/194,851

(22) Filed: Aug. 20, 2008

(65) Prior Publication Data

US 2010/0047061 A1 Feb. 25, 2010

(51) Int. Cl.
*F01D 11/08* (2006.01)
(52) U.S. Cl. .................. 415/173.1; 416/191; 60/753
(58) Field of Classification Search .............. 415/173.2, 415/232, 914, 173.1, 137; 416/181, 191; 60/753
See application file for complete search history.

(56) References Cited

U.S. PATENT DOCUMENTS

| | | | |
|---|---|---|---|
| 4,626,461 A | 12/1986 | Prewo et al. | |
| 4,704,332 A | 11/1987 | Brennan et al. | |
| 5,348,056 A | 9/1994 | Tsuzuki | |
| 6,013,592 A | 1/2000 | Merrill et al. | |
| 6,113,349 A | 9/2000 | Bagepalli et al. | |
| 6,126,389 A * | 10/2000 | Burdgick ............ | 415/115 |
| 6,197,424 B1 | 3/2001 | Morrison et al. | |
| 6,235,370 B1 | 5/2001 | Merrill et al. | |
| 6,287,511 B1 | 9/2001 | Merrill et al. | |
| 6,315,519 B1 | 11/2001 | Bagepalli et al. | |
| 6,331,496 B2 | 12/2001 | Nakayasu | |
| 6,342,269 B1 | 1/2002 | Yoshida et al. | |
| 6,464,456 B2 | 10/2002 | Darolia et al. | |
| 6,471,469 B2 | 10/2002 | Toffan et al. | |
| 6,602,048 B2 * | 8/2003 | Fujikawa et al. ............ | 415/116 |
| 6,641,907 B1 | 11/2003 | Merrill et al. | |
| 6,670,046 B1 | 12/2003 | Xia | |
| 6,676,783 B1 | 1/2004 | Merrill et al. | |
| 6,723,382 B2 | 4/2004 | Yamaguchi et al. | |
| 6,733,907 B2 | 5/2004 | Morrison et al. | |
| 6,758,653 B2 | 7/2004 | Morrison | |
| 6,854,738 B2 | 2/2005 | Matsuda et al. | |
| 6,893,214 B2 | 5/2005 | Alford et al. | |
| 6,895,757 B2 | 5/2005 | Mitchell et al. | |
| 7,044,709 B2 | 5/2006 | Bruce et al. | |
| 7,278,820 B2 | 10/2007 | Keller et al. | |
| 7,306,424 B2 * | 12/2007 | Romanov et al. ............ | 415/115 |
| 2004/0067316 A1 * | 4/2004 | Gray et al. .................. | 427/376.1 |
| 2004/0120835 A1 | 6/2004 | O'Hara | |
| 2005/0092566 A1 | 5/2005 | Good et al. | |
| 2005/0158168 A1 | 7/2005 | Bruce et al. | |

* cited by examiner

*Primary Examiner* — Caridad Everhart

(57) ABSTRACT

A ceramic matrix composite (CMC) component such as a ring seal segment (50, 50A, 50B, 50C, 50D) for a gas turbine engine (10), the component formed with a base plate (52) and a frame portion (54) that extends substantially normally from the base plate around its perimeter. A grid of intersecting CMC ribs (73) is formed on the base plate within the frame portion. The ribs have a height (H) that may be within 3 times the total thickness (B) of the base plate, including any rib base (39) bonded to the base plate, along at least most of the rib length. The grid of ribs may be assembled from an array of CMC cups (40) bonded to the base plate, to adjacent cups, and to the frame portion.

18 Claims, 7 Drawing Sheets

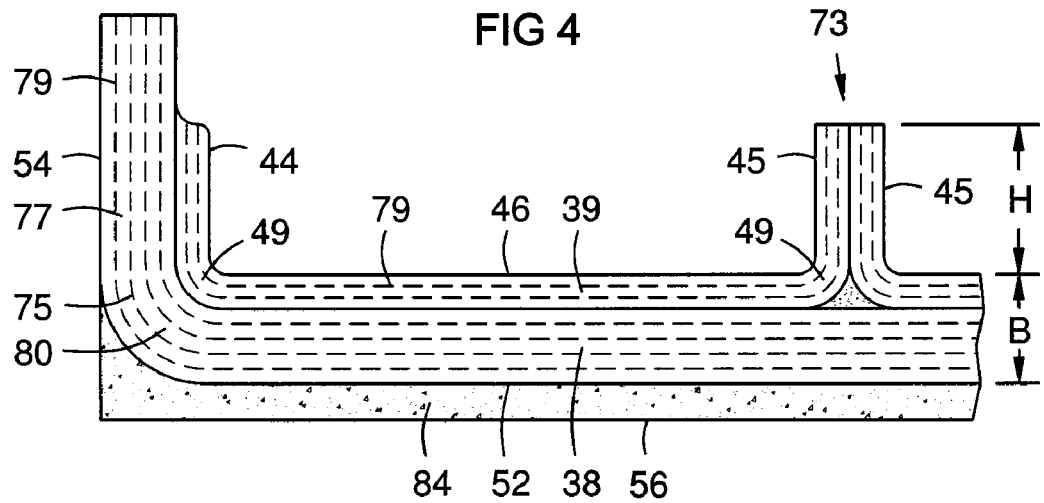
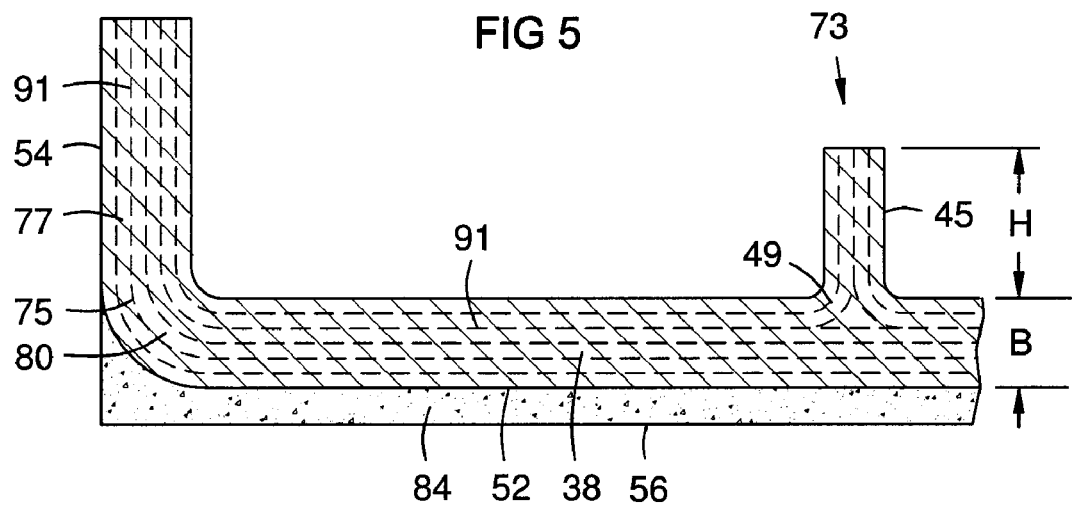

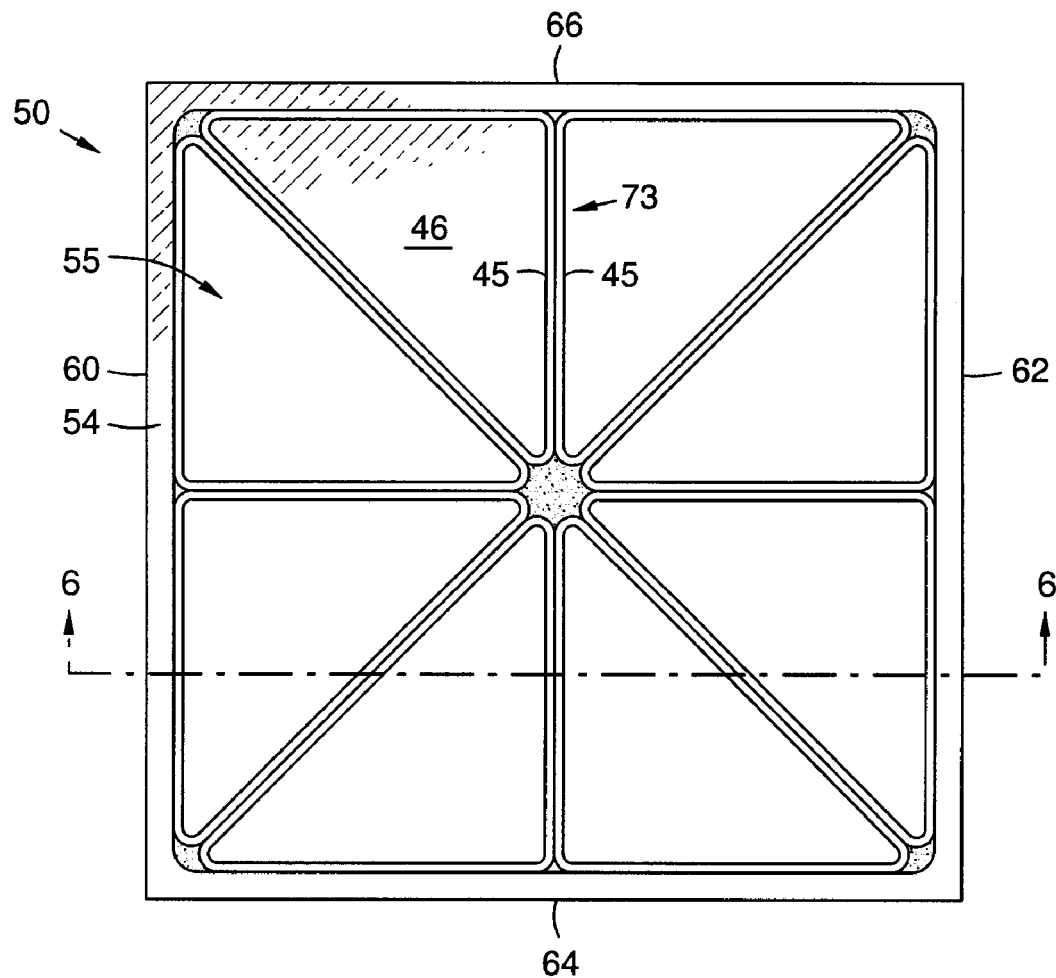
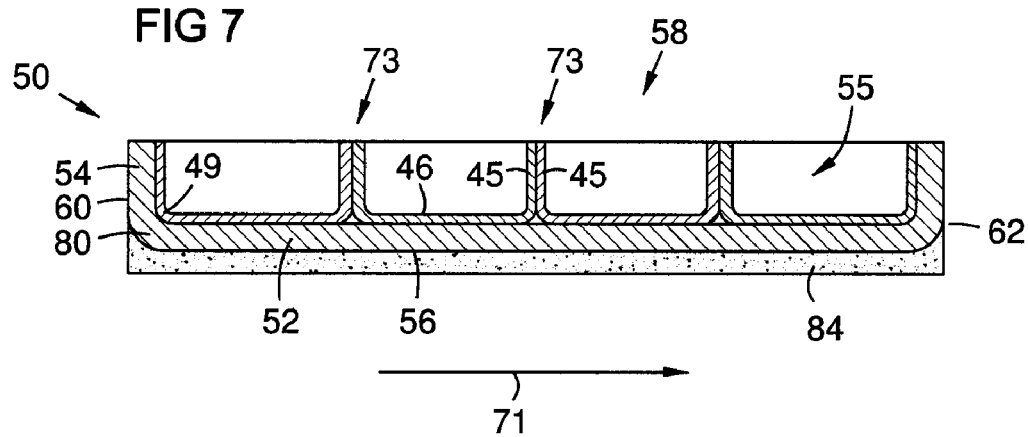

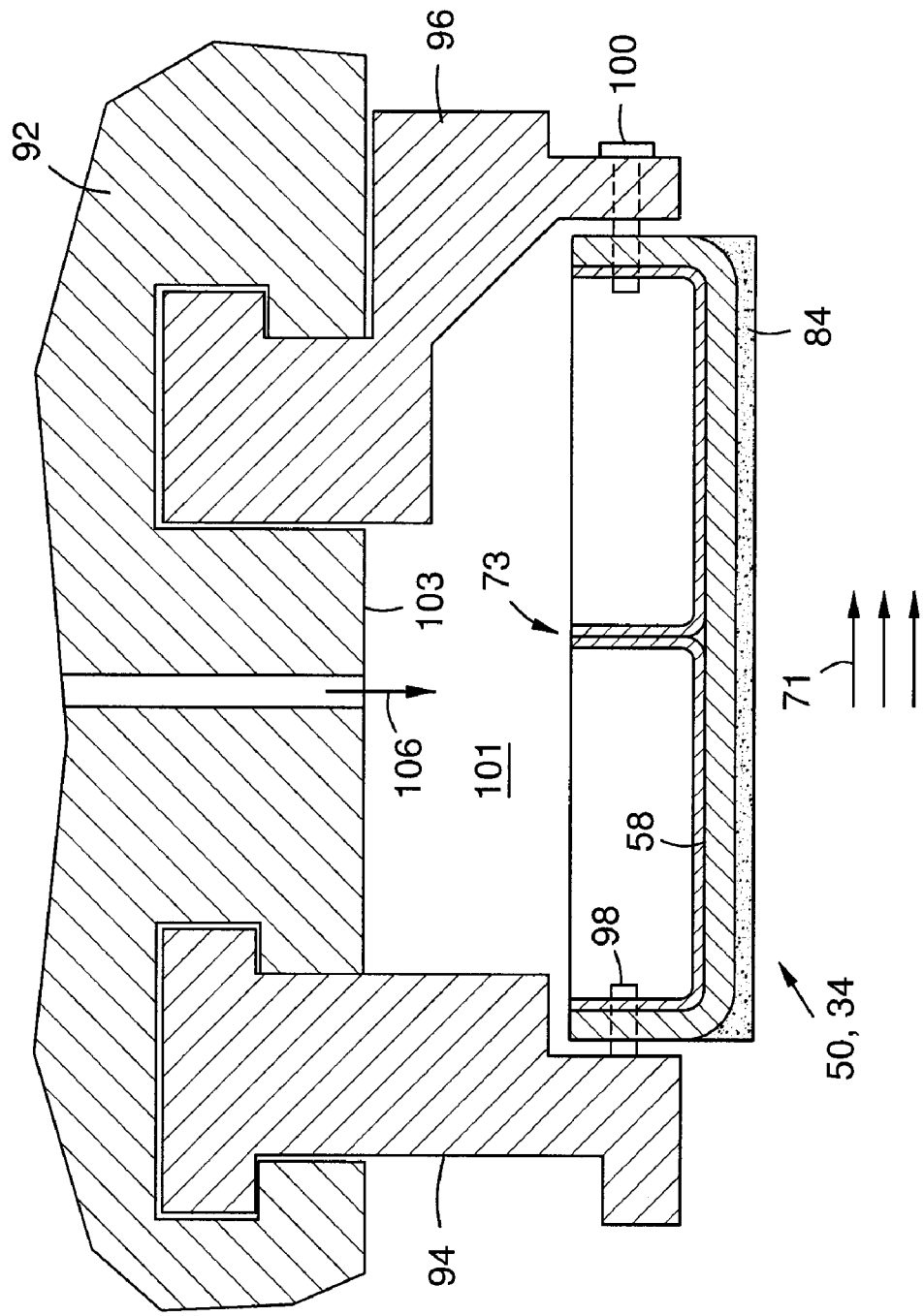

US 8,118,546 B2

GRID CERAMIC MATRIX COMPOSITE STRUCTURE FOR GAS TURBINE SHROUD RING SEGMENT

FIELD OF THE INVENTION

The invention relates in general to ceramic matrix composite (CMC) structures and, more particularly to CMC shroud ring segments in a gas turbine.

BACKGROUND OF THE INVENTION

FIG. 1 shows an example of a known gas turbine engine 10 having a compressor section 12, a combustor section 14 and a turbine section 16. In the turbine section 16, there are alternating rows of stationary airfoils 18 (commonly referred to as vanes) and rotating airfoils 20 (commonly referred to as blades). Each row of blades 20 is formed by a circular array of airfoils 20 attached to a disc 22 provided on a rotor 24 with an axis 59. The blades 20 extend radially outward from the discs 22 and terminate in blade tips 26. Herein, the terms "axial," "radial" and "circumferential" and variations thereof are intended to mean relative to the turbine axis 59. Each row of vanes 18 is formed by attaching a circular array of vanes 18 to a stationary vane carrier 28. The vanes 18 extend radially inward from the inner surface 30 of the vane carrier 28. The vane carrier 28 is attached to an outer casing 32, which encloses the turbine section 16 of the engine 10.

Between the rows of vanes 18, a ring seal 34 is attached to the inner surface 30 of the vane carrier 28. The ring seal 34 is a stationary component that acts as a hot gas path guide between the rows of vanes 18 at the locations of the rotating blades 20. The ring seal 34 is commonly formed by a plurality of ring segments. The ring segments are attached either directly to the vane carrier 28 or indirectly such as by attachment to metal isolation rings that attach to the vane carrier 28. Each ring seal 34 surrounds an array of blades 20 such that the tips 26 of the rotating blades 20 are in close proximity to the ring seal 34.

During engine operation, high temperature, high velocity gases 71 flow generally axially with respect to the turbine axis 59 through the rows of vanes 18 and blades 20 in the turbine section 16. The ring seals 34 are exposed to these gases. In order to withstand the high temperature, ring seals 34 may be cooled by a diverted portion of compressed intake air from the compressor 12. Demands to improve engine performance have been met in part by increasing engine firing temperatures. For this reason the ring seals 34 have been made of ceramic matrix composites (CMC), which have higher temperature capabilities than metal alloys. By utilizing such materials, cooling air can be reduced, improving engine performance, emission control and operating economics. Laminated CMC materials, both oxide and non-oxide based, have anisotropic strength properties. The interlaminar tensile and shear strengths (the through-thickness strengths) of CMC are substantially less than its in-plane strength.

CMC ring segments are typically attached to metal support structures outside the gas path. As a result, some of the CMC features are situated out-of-plane of the base plate; that is, some fibers of the CMC material are not parallel to the wall surface exposed to the hot gas path. Flanges or walls extend normally outward from the base plate to provide both rigidity and mounting points. During engine operation, differential pressure loads and other mechanical loads are reacted by these out-of-plane features.

Ring seal segments may be cooled by supplying a pressurized coolant such as air to the backside or "cold" side of the ring seal segment, which is its radially outer side. This coolant is supplied at a greater pressure than the hot gases 71 flowing through the turbine section in order to prevent the hot gas from leaking outward between the segments or into the cooled cavity. As a result, ring seal segments are subjected to pressure loading that is transmitted to the attachment points through the out-of-plane CMC features. This load passes through the intersections or transition regions between the out-of-plane features and the hot gas sealing wall—generally at 90° fiber corners and fillets where the CMC may be weakest. Such areas tend to be design-limiting features of these components.

A ring segment may be formed with a base plate and a frame of walls extending outwardly from the periphery of the base plate. However, such simple box-constructed ring segments are limited by interlaminar shear around the perimeter of the base plate. This shear is due to the pressure-induced normal force on the base plate from the cooling gas. A current approach is to simply thicken the walls and base plate until shear criteria are met. This is sufficient for some land-based power generation applications. However it is less practical as the pressure differential increases for efficiency in advanced engine designs, and it is undesirable in aero engines due to weight.

Isogrid structures are used in the aerospace industry for stiffening aircraft and spacecraft skins, engine casings, etc. These isogrids are optimized to minimize weight while maximizing bending stiffness to avoid buckling. An isogrid may be defined as a lattice of intersecting ribs forming an array of triangles, especially equilateral triangles. An orthogrid is a lattice of intersecting ribs forming an array of rectangles.

BRIEF DESCRIPTION OF THE DRAWINGS

FIG. 4 is a partial sectional view as in FIG. 3 with a shortened rib height.

FIG. 5 is a partial sectional view as in FIG. 3 with a shortened rib height using a 3-D weave.

FIG. 6 is a backside view of the ring seal segment of FIG. 2.

FIG. 7 is a sectional view taken along line 6-6 of FIG. 6.

FIG. 8 is a sectional view of a ring seal segment attached to a turbine stationary support structure.

DETAILED DESCRIPTION OF THE INVENTION

The inventors recognized a need for a ceramic matrix composite (CMC) structure that minimizes the limiting aspects of CMC material and manufacturing constraints, and improves the normal pressure loading capability without weight increase. Shear stress in the base plate 52 of ring segments is inversely proportional to the total length of supporting walls 54 extending from the backside of the base plate (times the thickness of the plane and walls). Therefore, by increasing the total supporting wall length via a grid of ribs 73, this shear stress can be reduced by transferring interlaminar shear loads in the base plate to in-plane loads in the ribs 73, resulting in more strain-tolerant and overload-tolerant designs.

Figure 2:
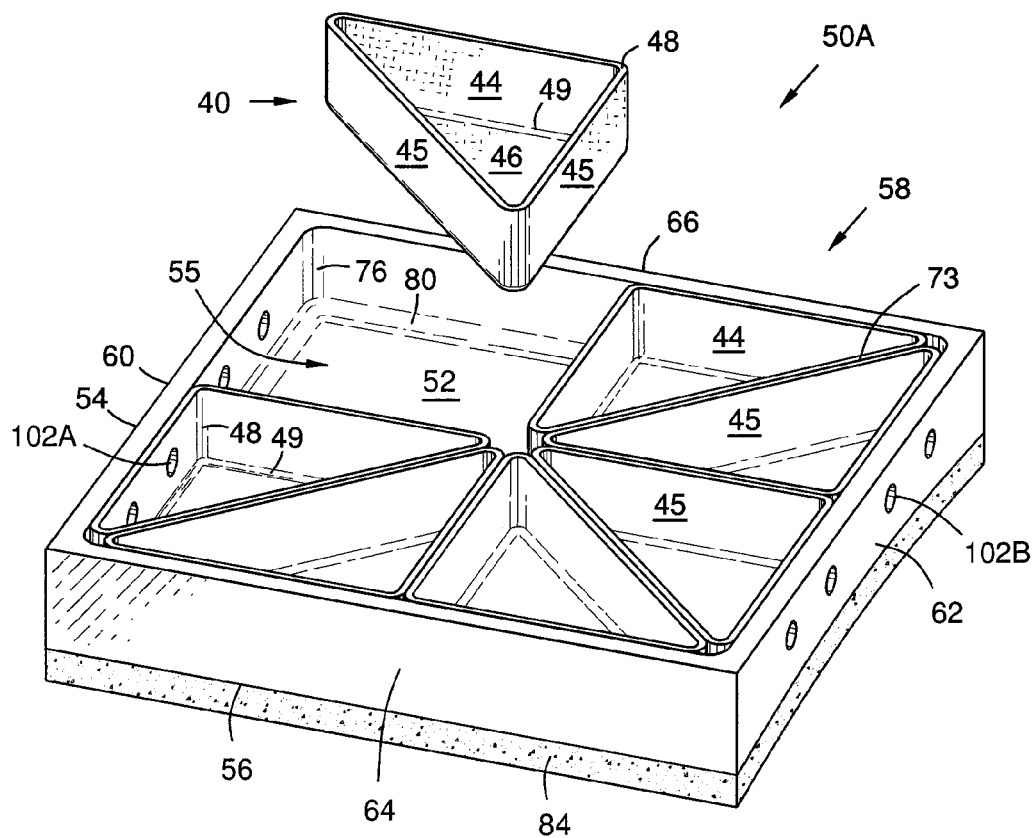
FIG. 2 is a perspective view of a ring seal segment embodiment A per aspects of the invention in an assembly stage.

FIG. 2 shows an embodiment 50A of a ring seal segment during assembly per aspects of the invention. It includes a base plate 52 and a frame of walls 54 extending generally radially outward from the base plate around a space 55. The frame walls 54 may be formed together as a single piece with each other and with the base plate 52 in a unitary construction. The frame may have various geometries, such as substantially triangular, rectangular, parallelogrammatic or trapezoidal. The base plate 52 has a radially inner or proximal surface 56 with respect to the turbine axis. The base plate may be generally flat or curved, but at least its inner surface 56 normally has a curved surface of rotation centered on the turbine axis 59. The ring seal segment 50A has an upstream side 60, a downstream side 62, a first circumferential side 64, and a second circumferential side 66. The radially outer side of the ring segment will be called its backside 58. Because the ring seal segment 50A is exposed to hot combustion gases during engine operation, its inner surface 56 may be coated with a thermal barrier coating 84 as known in the art. Upstream and downstream pin holes 102A and 102B may be provided for mounting pins and/or bolts such as shown in FIG. 8.

A grid of ribs 73 may be formed of rib walls 45 within the framed space 55. In embodiment 50A, the ribs may be assembled from cups 40 of CMC inserted into the space 55 and cured together with the base plate 52 and the frame walls 54 to form a unitary construction. Each cup 40 has a bottom wall or rib base 46 that merges with, or is bonded to, the base plate 52 during curing. In this example, all of the cups 40 also have a perimeter attachment wall 44 that merges with, or is bonded to, a frame wall 54 during curing. Alternate embodiments with a finer grid structure many include some cups that are not adjacent to the frame walls. Intersections 48, 49, 76, and 80 between the CMC portions 44, 45, 52, and 54 are termed "transition regions" herein. The cups 40 may be formed by 3-dimensional weaving as known in the art, or by lay-up of one or more laminas from CMC fabric in patterns that provide continuous and/or overlapping fibers at each transition region.

Figure 3:
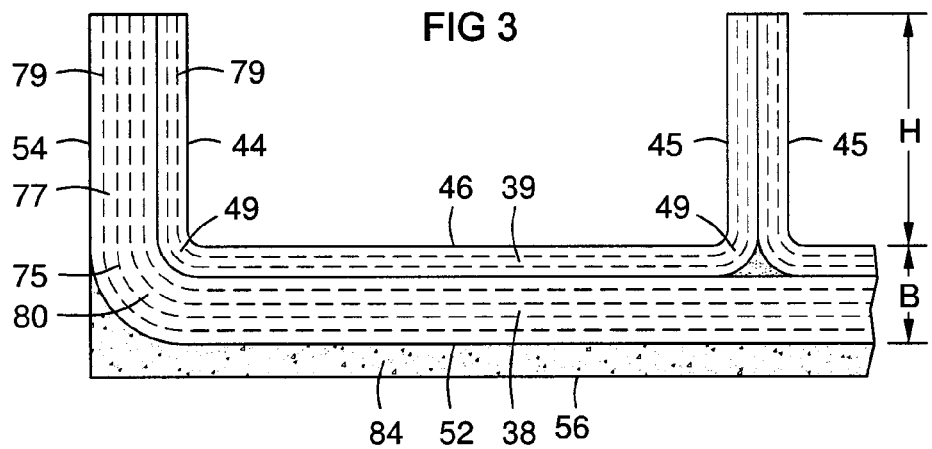
FIG. 3 is a partial sectional view of a CMC structural embodiment of the invention.

FIG. 3 shows a portion of a CMC structure for a ring seal segment made of a plurality of reinforcing fibers 75 embedded in a ceramic matrix 77. The fibers may be in the form of plies or laminas 79 as shown. This embodiment has a first laminar portion 38 forming the base plate 52 and the frame walls 54, and a second laminar portion 39 that forms the rib base 46, rib walls 45, and peripheral attachment walls 44. At least some of the plies 79 or fibers 75 may span continuously across each transition region 48, 49, 76, and 80, and extend into a portion of each of the adjacent CMC portions of the intersection. For example, at least about 50% of the fibers in the transition region may span continuously across the transition region and can extend into a portion of each of two intersecting side walls.

Figure 11:
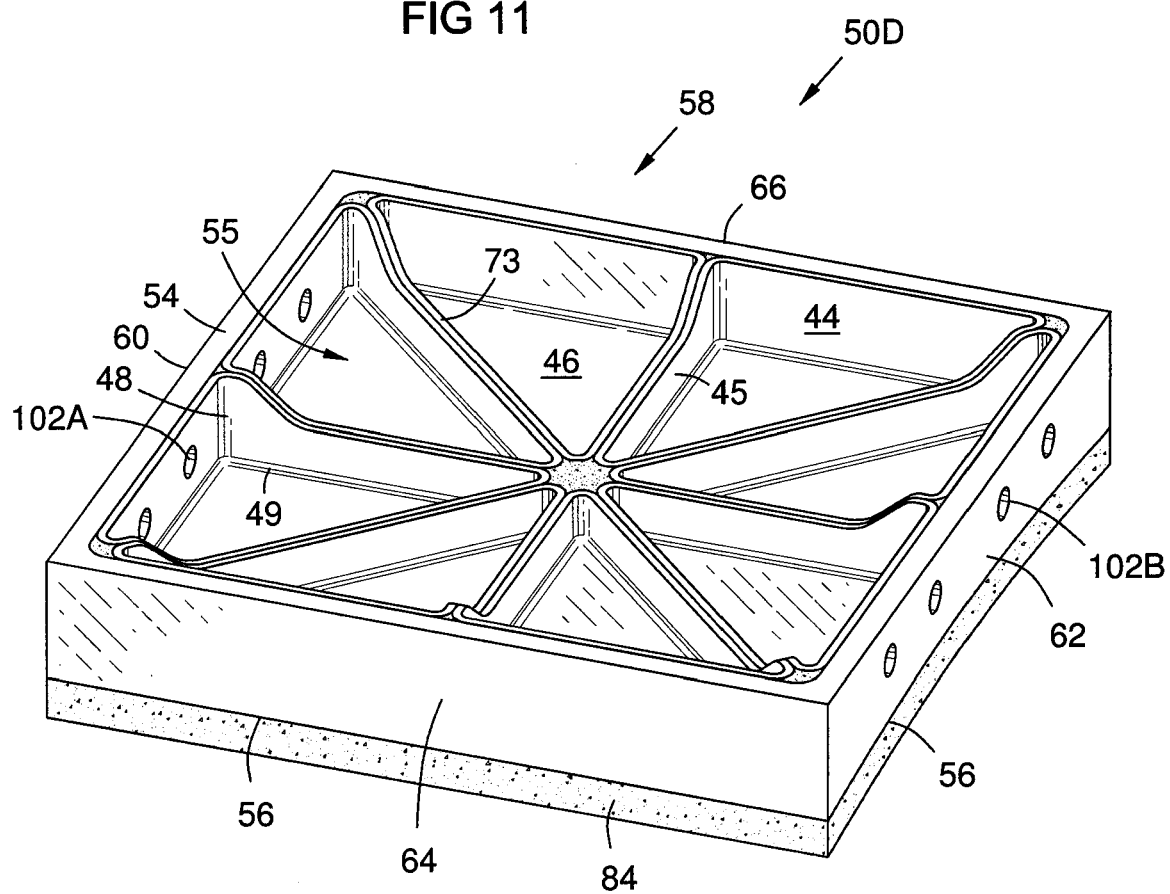
FIG. 11 is a perspective view of an embodiment D of a ring seal segment per aspects of the invention.

The in-plane shear strength in CMC laminates can be much greater than the interlaminar shear strength. For an exemplary strength ratio of 3, a rib 73 that is twice as high as the total thickness B of the base plate 52 has six times the shear strength of the base plate in a plane normal to the base plate. This strength ratio is less dependent on the rib width than it is in buckling resistance applications. Thus, the rib height and thickness is optimized differently for the present application than in other applications. FIG. 4 shows a portion of a ring seal segment with a rib height H that is about 1.4 times the thickness B of the combined base laminas 38, 39. This reduces weight compared to FIG. 3, while fully reinforcing the interlaminar shear strength of the base laminas 38, 39 against differential gas pressure, allowing the base plate 52 thickness to be reduced. Optimizing the base plate thickness, rib height, total weight, and other requirements in combination, suggests that an optimum rib height may be less than 3 times the total thickness of the base plate 52, and especially 1-2 times that thickness. However, it is beneficial to smoothly increase the rib height adjacent the frame walls as in FIG. 11 to increase a gusset aspect of the ribs to reduce bending of the base plate, and reduces stress concentration in fillets between the base plate 52 and frame 54. Herein the term "total thickness of the base plate" means the thickness of the base plate and any rib base laminas that may be present, depending on the embodiment. The second laminar portion 39 may have perimeter attachment walls 44 that are the same height as the ribs 73 as in FIG. 4, or the full height of the frame walls 54 as in FIG. 11. In either case, they strengthen the frame walls.

The use of a rigid framework of ribs 73 for a ring seal segment provides a load distribution structure that advantageously exploits the anisotropic strength properties of the CMC material, rather than being limited by those anisotropic strength properties as are CMC ring seal segments of the prior art. At least a portion of the pressure loads applied to the base plate 52 are distributed to the side walls as in-plane compression and tension loads through the ribs 73, thereby reducing the loads that are transferred as interlaminar shear loads through the transition region 80. The ribs 73 essentially act as T-beams that convert the radially inward directed pressure loads into circumferentially directed tension and compression loads. Further, the pressure loads are applied to the side frame 54 along a height H rather than being applied only at the base of the side frame 54. By reducing the limiting interlaminar stress in the transition region, the overall ability of the structure to carry loads is made more efficient, thereby allowing the total weight of the structure to be lowered for a given amount of load-carrying capability.

A component per the invention may be formed by any suitable fabrication technique, such as winding, weaving, and fabric or unidirectional tape lay-ups. In one embodiment, ceramic fabric can be pre-impregnated with matrix slurry and can be formed into or onto a mold. Each fabric ply 79 can be cut with a unique pattern such that during lay-up, any fabric splices are not aligned between adjacent plies or occur within a minimum specified distance from splices in other superimposed plies. In addition, the individual plies 79 can be formed with most or all of the fibers 75 in the base plate 52 extending continuously into the side walls 54 with minimal or no splices. Any darts cut to allow formation of the transition regions 76, 80 and the frame walls 54 may account for displacement that can occur from compaction of the laminas such that, in the compacted state, the splices can form butt-joints with minimal gap or may overlap. Compaction can be by any of various forms, including hard tooling, pressure, vacuum, or combinations thereof. In the final state, the spliced joints can be distributed uniformly across either side of the transition regions 76, 80, thus retaining most or all of the reinforcing fibers 75 intact across the transition regions 76, 80. Thus, various embodiments can alter the amount and method of reinforcing fiber 75 joining the base plate 52 and the sidewalls 54 as well as the mating sidewalls 54 to each other.

FIG. 5 shows a base plate 52 frame 54 and rib 73 formed of CMC with a 3-D woven fiber 91 using weaving techniques known in the art. FIG. 6 is a backside view of FIG. 2. FIG. 7 is a sectional view of FIG. 2 taken along line 6-6 of FIG. 6.

Figure 1:
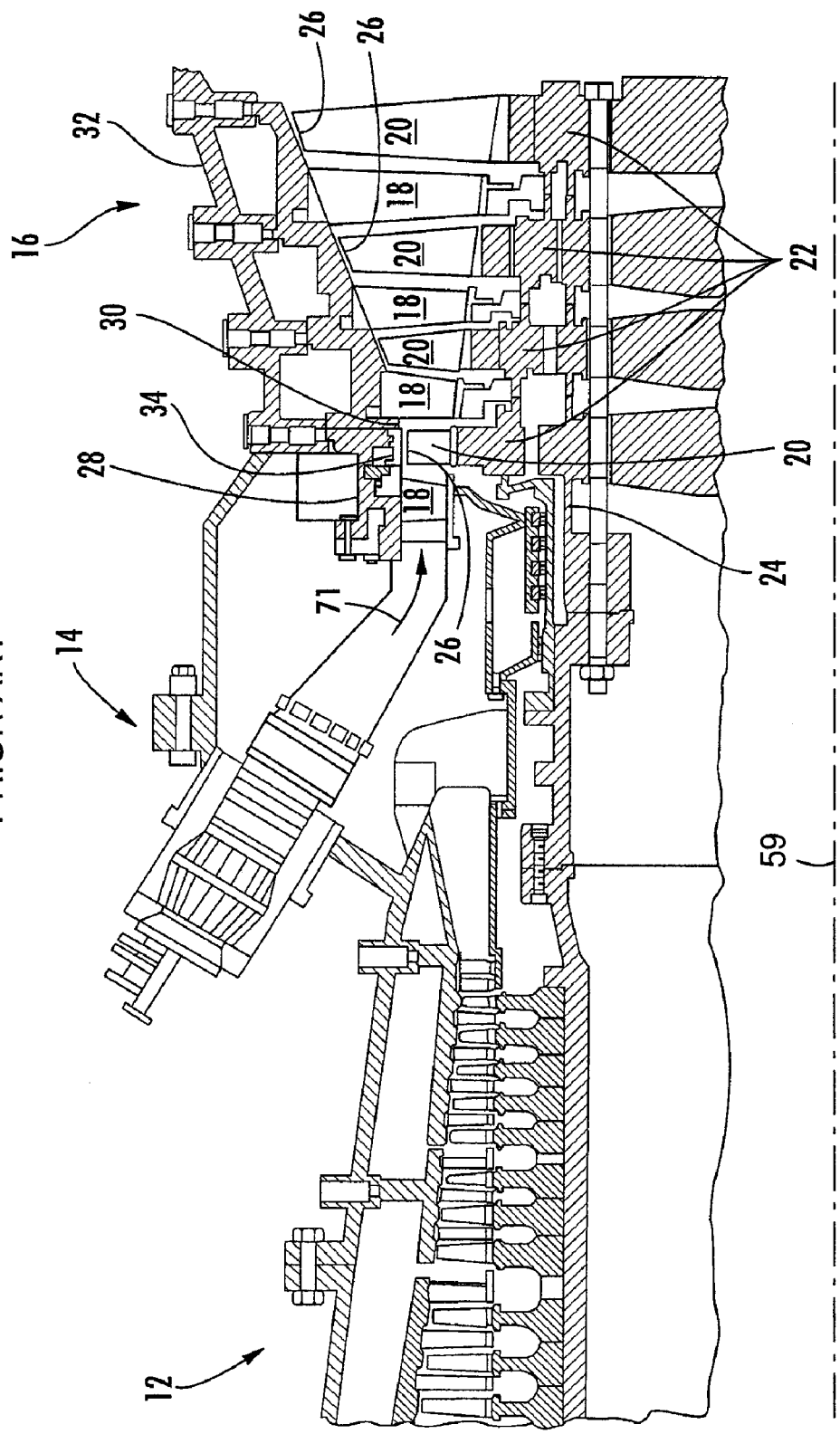
FIG. 1 is a partial sectional view of a known turbine engine.

FIG. 8 shows an example of a ring seal segment 50 in a sectional view as installed in a turbine engine. The ring seal segment 50 may be connected by pins 98, 100 or other known means to a stationary support structure such as upstream and downstream isolation rings 94, 96 that extend inward from a vane carrier 92 attached to the engine casing. A cooling plenum 101 can be defined between the ring seal segments 50 and an inner surface 103 of the vane carrier 92 to distribute pressurized coolant fluid such as air 106 to the backsides of the ring segments 50. Additional ring seal segments 50 can be attached to the stationary support structure in a similar manner as above. The plurality of the ring seal segments 50 can be installed so that each circumferential side 64, 66 of one ring seal segment 50 substantially abuts one of the circumferential sides 64, 66 of neighboring ring seal segments 50 so as to collectively form an annular ring seal 34 also shown in FIG. 1. Sealing as known in the art may be provided between adjacent ring segments and between ring segments and vane isolation rings 94, 96 or vane backing plates (not shown) to minimize escape of coolant 106 into the hot gas path 71. The ring seal substantially surrounds a row of blades such that the tips of the rotating blades are in close proximity to the ring seal.

During engine operation, the ring seal segments 50 are subjected to a variety of loads from thermal expansion, vibration, pressure differential, and blade tip contact. These loads are reacted or accommodated by the pins 98 and 100. Either the upstream or downstream set of these pins may be slidable, to accommodate thermal expansion.

Figure 9:
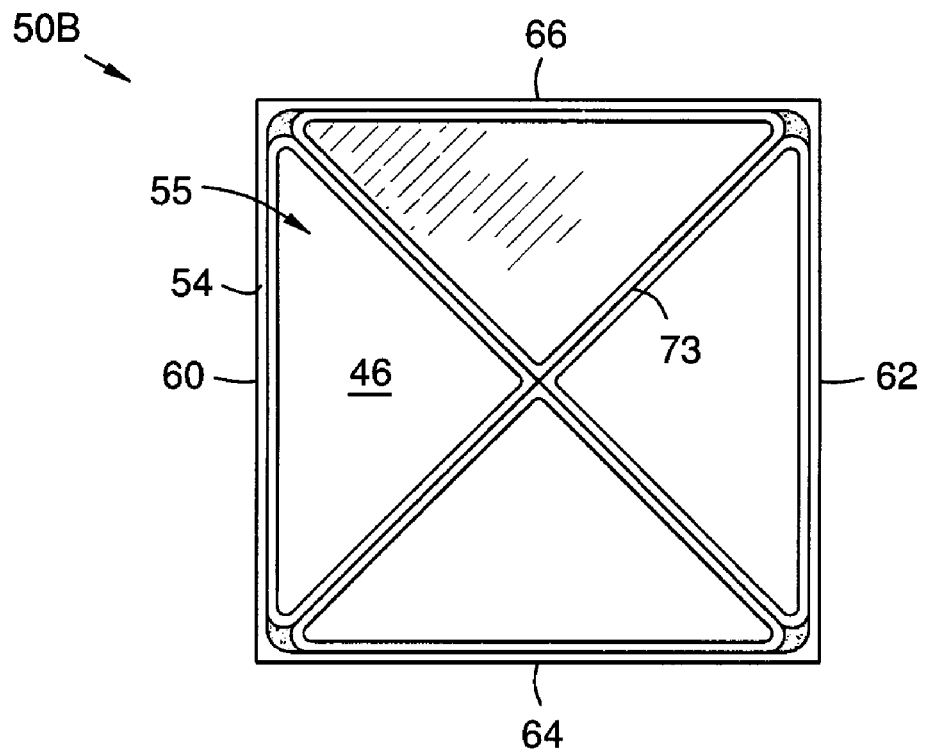
FIG. 9 is a backside view of an embodiment B of a ring seal segment per aspects of the invention with a diagonal rib geometry.
Figure 10:
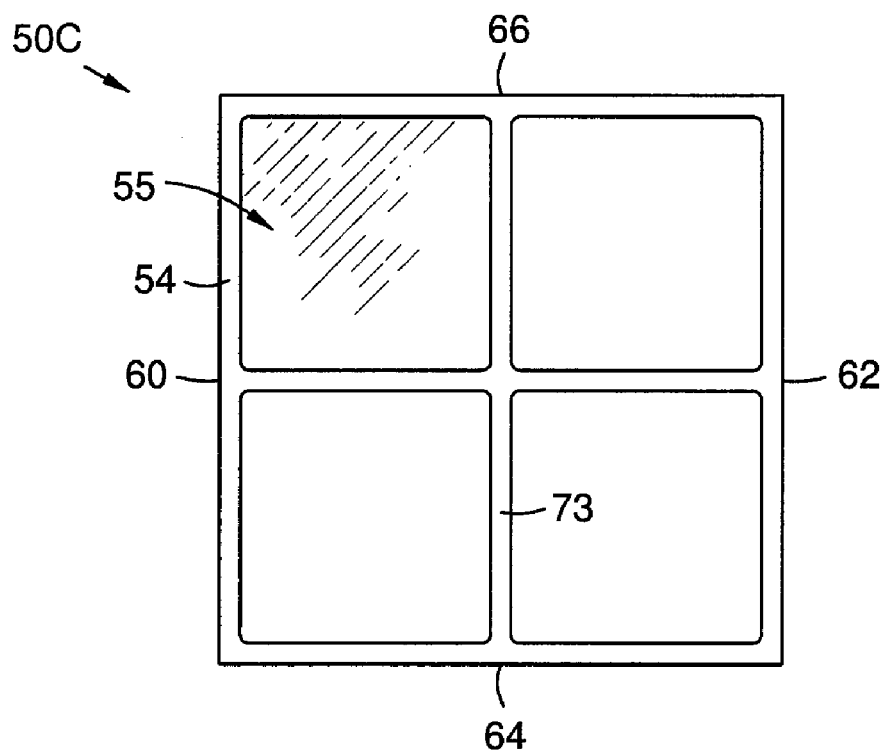
FIG. 10 is a backside view of an embodiment C of a ring seal segment per aspects of the invention with a 3-D weave orthogrid rib geometry.

FIG. 9 illustrates an embodiment of a ring segment 50B with a diagonal rib 73 geometry. FIG. 10 illustrates an embodiment of a ring segment 50C with an orthogrid rib 73 geometry using a 3-dimensional weave.

The foregoing description is provided in the context of ring seal segments in a turbine engine. However, aspects of the invention are not limited to ring seal segments. For example, a CMC structure as described herein can be used in other segmented components of a turbine engine where primarily a fluid pressure differential exists, such as in a heat shield in the combustor section of a turbine engine.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A ceramic matrix composite component for a turbine engine comprising:
   a body made of a ceramic matrix composite (CMC) material comprising a ceramic matrix and a plurality of fibers therein;
   the body comprising a base plate and a frame portion;
   the frame portion comprising frame walls that are unitary with the base plate, substantially follow a perimeter of the base plate, and extend substantially normally from the base plate; and
   a lattice of intersecting CMC ribs forming a grid in an area framed by the frame portion, the ribs extending substantially normally from the base plate, distal ends of at least some of the ribs intersecting the frame walls;
   wherein the grid comprises an array of cells, each cell formed as a cup of CMC, the cup comprising:
   a bottom wall merged or bonded with the base plate to form a rib base;
   cup side walls merged or bonded with adjacent ones of the cups to form the ribs; and
   wherein at least some of the cups comprise at least one perimeter attachment wall merged or bonded with at least one of the frame walls.

2. The ceramic matrix composite component of claim 1 wherein a transition between two of the frame walls occurs in a transition region, and at least 50% of the fibers adjacent to the transition region in said two frame walls span continuously across the transition region and extend into a portion of each of said two frame walls.

3. The ceramic matrix composite component of claim 1, wherein the ribs have a height that is within three times the total thickness of the base plate plus the rib base along at least most of the rib length.

4. The ceramic matrix composite component of claim 1, wherein the ribs have a height that is between 1 and 2 times the total thickness of the base plate plus the rib base along at least most of the rib length.

5. The ceramic matrix composite of claim 1 in the form of a gas turbine ring seal segment, wherein the cup perimeter attachment walls have a height approximately the same as the frame walls along at least most of the frame wall length, and wherein the ribs vary in height from approximately the height of the frame walls distally, or adjacent the frame walls, to within three times the total thickness of the base plate plus the rib base proximally, or away from the frame walls.

6. A ceramic matrix composite component for a turbine engine comprising:
   a body made of a ceramic matrix composite (CMC) material comprising a ceramic matrix and a plurality of fibers therein;
   the body comprising a base plate and a frame portion;
   the frame portion comprising frame walls that are unitary with the base plate, substantially follow a perimeter of the base plate, and extend substantially normally from the base plate; and
   a lattice of intersecting CMC ribs forming a grid in an area framed by the frame portion, the ribs extending substantially normally from the base plate, distal ends of at least some of the ribs intersecting the frame walls;
   wherein the grid comprises an isogrid and/or orthogrid geometry; and
   wherein a transition between two of the frame walls occurs in a transition region, and at least 50% of the fibers adjacent to the transition region in said two frame walls span continuously across the transition region and extend into a portion of each of said two frame walls.

7. The ceramic matrix composite component of claim 6, wherein the grid comprises an array of cells, each cell formed as a cup of CMC, the cup comprising:
   a bottom wall merged or bonded with the base plate to form a rib base;
   cup side walls merged or bonded with adjacent ones of the cups to form the ribs; and
   wherein at least some of the cups comprise at least one perimeter attachment wall merged or bonded with at least one of the frame walls.

8. The ceramic matrix composite component of claim 6, wherein the base plate, the frame walls, and the ribs are formed from a 3-dimensionally woven reinforcement fabric in a ceramic matrix.

9. The ceramic matrix composite component of claim 6, further including a stationary turbine support structure, wherein at least two of the frame walls are connected to the stationary turbine support structure, and wherein the base plate comprises a radially inner surface with a thermal barrier coating.

10. The ceramic matrix composite component of claim 6, wherein the ribs have a height that is within three times the total thickness of the base plate along at least most of the rib length.

11. The ceramic matrix composite of claim 6, wherein the ribs have a height that is between 1 and 2 times the total thickness of the base plate along at least most of the rib length.

12. A gas turbine engine ring seal segment comprising:
a ring seal segment body made of ceramic matrix composite (CMC) comprising a ceramic matrix and a plurality of fibers therein;
the CMC body comprising a base plate and a generally rectangular frame portion, the base plate and the frame portion being unitary with each other;
the frame portion extending substantially radially outward from the base plate, the frame portion having an upstream frame wall, a downstream frame wall, and first and second circumferential frame walls, wherein the upstream frame wall transitions into each of the first and second transverse frame walls, and wherein the downstream frame wall transitions at opposite ends into the first and second transverse frame walls;
a grid of intersecting CMC ribs within the frame portion, each rib extending substantially radially outwardly from the base plate;
wherein the grid intersects the frame portion at distal ends of at least some of the ribs; and
wherein the transition between each of the frame walls occurs in a respective transition region, and wherein at least about 50% of the fibers in the transition region span continuously across the transition region and extend into a portion of each of the adjacent frame walls.

13. The ceramic matrix composite component of claim 12, wherein the grid comprises an array of cells, each cell formed as a cup of CMC, the cup comprising:
a bottom wall merged or bonded with the base plate to form a rib base;
cup side walls merged or bonded with adjacent ones of the cups to form the ribs; and
wherein at least some of the cups comprise at least one perimeter attachment wall merged or bonded with at least one of the frame walls.

14. The ceramic matrix composite component of claim 13, wherein the ribs have a height between 1 and 2 times the total thickness of the base plate plus the rib base along at least most of the total rib length.

15. The ceramic matrix composite component of claim 12, wherein the grid comprises an isogrid and/or orthogrid geometry.

16. The ceramic matrix composite component of claim 15, wherein the base plate, the frame walls, and the ribs comprise a 3-dimensionally woven reinforcement fabric in a ceramic matrix.

17. The ceramic matrix composite component of claim 15, wherein the ribs have a height within three times the total thickness of the base plate along at least most of the total rib length.

18. The ceramic matrix composite of claim 15, wherein the ribs have a height between 1 and 2 times the total thickness of the base plate along at least most of the total rib length.

* * * * *